United States Patent
Tsuchiya et al.

(10) Patent No.: US 8,906,533 B2
(45) Date of Patent: Dec. 9, 2014

(54) BATTERY MODULE

(75) Inventors: Kazuya Tsuchiya, Nisshin (JP); Kazutaka Tatematsu, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/556,693

(22) Filed: Jul. 24, 2012

(65) Prior Publication Data

US 2013/0034768 A1  Feb. 7, 2013

(30) Foreign Application Priority Data

Aug. 3, 2011 (JP) ................. 2011-169968

(51) Int. Cl.
| | |
|---|---|
| H01M 10/50 | (2006.01) |
| H01M 10/613 | (2014.01) |
| H01M 10/6555 | (2014.01) |
| H01M 10/6556 | (2014.01) |
| H01M 10/647 | (2014.01) |
| H01M 10/052 | (2010.01) |
| H01M 10/656 | (2014.01) |

(52) U.S. Cl.
CPC ........ *H01M 10/5032* (2013.01); *H01M 10/052* (2013.01); *H01M 10/5061* (2013.01); *H01M 10/5004* (2013.01); *H01M 10/5055* (2013.01); *H01M 10/5057* (2013.01)
USPC ........................................ 429/120

(58) Field of Classification Search
None
See application file for complete search history.

(56) References Cited

U.S. PATENT DOCUMENTS

2012/0094166 A1  4/2012  Lee et al.

FOREIGN PATENT DOCUMENTS

| | | |
|---|---|---|
| JP | 2003-133188 A | 5/2003 |
| JP | 2004103258 A | 4/2004 |
| JP | 2006-196230 A | 7/2006 |
| JP | 2008047371 A | 2/2008 |
| KR | 10-2011-0030225 * | 3/2011 |
| WO | 2011/034325 A2 | 3/2011 |

* cited by examiner

*Primary Examiner* — Ula C. Ruddock
*Assistant Examiner* — Matthew Van Oudenaren
(74) *Attorney, Agent, or Firm* — Sughrue Mion, PLLC

(57) ABSTRACT

A battery module includes; a plurality of battery cell packs; a plurality of heat dissipation plates and a cooler that absorbs heat radiated from the battery cell packs and absorbed by the heat dissipation plates. The battery cell packs and the heat dissipation plates being alternately stacked. Each of the heat dissipation plates has an interlayer plate portion that is in contact with corresponding two of the battery cell packs and side wall plate portions that extend in the stacking direction with respect to the interlayer plate portion on both end sides of the interlayer plate portion and that are in contact with the cooler at outer faces thereof, and each of the heat dissipation plates has a low thermal resistance region between the interlayer plate portion and each side wall plate portion, the low thermal resistance region having a lower thermal resistance than the interlayer plate portion.

9 Claims, 6 Drawing Sheets

BATTERY MODULE

INCORPORATION BY REFERENCE

The disclosure of Japanese Patent Application No. 2011-169968 filed on Aug. 3, 2011 including the specification, drawings and abstract is incorporated herein by reference in its entirety.

BACKGROUND OF THE INVENTION

1. Field of the Invention

The invention relates to a battery module in which a plurality of battery cell packs are stacked.

2. Description of Related Art

A battery module in which a plurality of battery cell packs are stacked is, for example, described in Japanese Patent Application Publication No. 2003-133188 (JP 2003-133188 A) and Japanese Patent Application Publication No. 2006-196230 (JP 2006-196230 A).

JP 2003-133188 A describes a structure that a heat conductor is arranged between any adjacent cells and heat emitted from the cells is dissipated from both end portions of each heat conductor to cooling elements. In addition, JP 2006-196230 A describes a structure that an interlayer member that serves as a heat radiating member is arranged between any adjacent battery cells and heat emitted from the battery cells is radiated from both end portions of each interlayer member.

The configuration of a battery module 100A according to the related art is described with reference to FIG. 10 to FIG. 12. FIG. 10 is a cross-sectional view that shows the structure of the battery module 100A and that is taken along the line X in FIG. 11. In addition, FIG. 11 is a perspective view that shows the structure of each battery cell pack 150 and the structure of each heat dissipation plate 110. FIG. 12 is a cross-sectional view that shows a cooling structure employed in the battery module 100A.

As shown in FIG. 10, the heat dissipation plate 110 is arranged between any adjacent two of the plurality of battery cell packs 150. Each heat dissipation plate 110 absorbs heat emitted from the battery cell packs 150 and then radiates the heat to the outside. Thus, the battery cell packs 150 and the heat dissipation plates 110 are alternately arranged. For example, in the single battery module 100A, ninety battery cell packs 150 are stacked in a stacking direction S.

Each battery cell pack 150 generally has a structure as follows. Lithium cobaltate ($LiCoO_2$) or lithium manganate ($LiMnO_2$) is used as a positive electrode, and graphite (carbon) is used as a negative electrode. A separator is interposed between the electrodes for electrical insulation. Several layers of the electrode plates are stacked and then sealed with aluminum lamination, or the like, together with an electrolytic solution.

Pressing plates 101 are arranged on both end portions of the battery cell packs 150 and heat dissipation plates 110 in the stacking direction S. The battery cell packs 150 and the heat dissipation plates 110 are alternately stacked in the stacking direction S. Heat emitted from the battery cell packs 150 located at both ends is absorbed by the pressing plates 101 and then radiated from the pressing plates 101. The pressing plates 101 are made of a material having an excellent thermal conductivity (aluminum, or the like).

As shown in FIG. 11, each battery cell pack 150 has a flattened body portion and electrode portions 150a that are provided on the upper end portion of the body portion. The plurality of battery cell packs 150 are electrically connected in series with one another.

Each heat dissipation plate 110 has an interlayer plate portion 110a and side wall plate portions 110b, and has a C shape as a whole. The interlayer plate portion 110a is in plane contact with the body portion of the battery cell pack 150, and is interposed between the adjacent battery cell packs 150. The side wall plate portions 110b extend in the stacking direction with respect to the interlayer plate portion 110a on both ends of the interlayer plate portion 110a.

As shown in FIG. 12, for the stacked battery cell packs 150 and heat dissipation plates 110, coolers 130 are respectively arranged on the outer faces of the side wall plate portions 110b of the heat dissipation plates 110 along the battery module 100A. The coolers 130 are arranged along both side faces of the battery module 100A. Each cooler 130 has a cooling pipe 131 and a cooling medium 132. The cooling pipe 131 is in contact with the outer faces of the side wall plate portions 110b. The cooling medium 132 is introduced into the cooling pipe 131.

Grease 140 is applied between the cooling pipes 131 and the outer faces of the side wall plate portions 110b in order to increase heat transfer therebetween.

Heat emitted from the battery cell packs 150 conducts through the heat dissipation plates 110 and is absorbed by the cooling pipes 131. By so doing, an increase in the temperature of the battery cell packs 150 is suppressed to thereby maintain the performance of the battery cell packs 150 and extend the service life of the battery cell packs 150.

As shown in FIG. 12, heat emitted from each battery cell pack 150 roughly includes flow of heat that is shown arrow B in the drawing and flow of heat the is shown arrow A in the drawing. The flow of heat (arrow B in the drawing) reaches any one of the side wall plate portions 110b through the interlayer plate portion 110a of the heat dissipation plate 110. The flow of heat (arrow A in the drawing) reaches the interlayer plate portion 110a and the side wall plate portion 110b through the battery cell pack 150.

In this case, heat concentrates at portion Y (circled in FIG. 12) of the interlayer plate portion 110a, which is in proximity to the side wall plate portion 110b. Thus, the thermal resistance increases and, as a result, heat is hard to conduct to the side wall plate portion 110b. Therefore, there occurs nonuniform temperature distribution in the battery cell pack 150. This may lead to a decrease in the performance of the battery cell pack 150.

It is conceivable that the thickness of each heat dissipation plate 110 is increased in order to decrease the thermal resistance. However, if the thickness of each heat dissipation plate 110 is increased, this leads to an increase in the weight of the battery module and an increase in the size of the battery module.

SUMMARY OF THE INVENTION

The invention provides a battery module having a structure that is able to efficiently radiate heat emitted from battery cell packs without an increase in the weight or size of the battery module.

An aspect of the invention provides a battery module. The battery module includes: a plurality of battery cell packs; a plurality of heat dissipation plates, the battery cell packs and the heat dissipation plates being alternately stacked in a stacking direction; and a cooler that absorbs heat radiated from the battery cell packs and absorbed by the heat dissipation plates. The cooler is arranged along each side face of the battery module, each of the heat dissipation plates has an interlayer plate portion that is in contact with the corresponding two of the battery cell packs and side wall plate portions that extend in the stacking direction with respect to the interlayer plate portion on both end sides of the interlayer plate portion and that are in contact with the cooler at outer faces thereof, and each of the heat dissipation plates has a low thermal resistance region between the interlayer plate portion and each side wall plate portion, the low thermal resistance region having a lower thermal resistance than the interlayer plate portion.

In the above aspect, in a cross-sectional view that is taken along the stacking direction and that includes the cooler, each low thermal resistance region may be provided on both sides of the corresponding interlayer plate portion in a thickness direction of the interlayer plate portion.

In the above aspect, in a cross-sectional view that is taken along the stacking direction and that includes the cooler, a thickness of each low thermal resistance region may be larger than a thickness of the corresponding interlayer plate portion.

In the above aspect, the low thermal resistance regions, the interlayer plate portion and the side wall plate portions may be formed of an integrated continuous member (single-piece member).

In the above aspect, in a cross-sectional view that is taken along the stacking direction and that includes the cooler, a thickness of each of both end portions of each battery cell pack may be smaller than a thickness of a center portion of each battery cell pack.

According to the above aspect of the invention, it is possible to provide a battery module having a structure that is able to efficiently radiate heat emitted from battery cell packs without an increase in the weight or size of the battery module.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A battery module according to embodiments of the invention will be described with reference to the accompanying drawings. Note that, when the number, amount, and the like, of components are referred to in the embodiments described below, the scope of the invention is not necessarily limited to those number, amount, and the like, unless otherwise specified. In addition, the aspect of the invention also encompasses a combination of the components described in the respective embodiments where appropriate.

Figure 10:
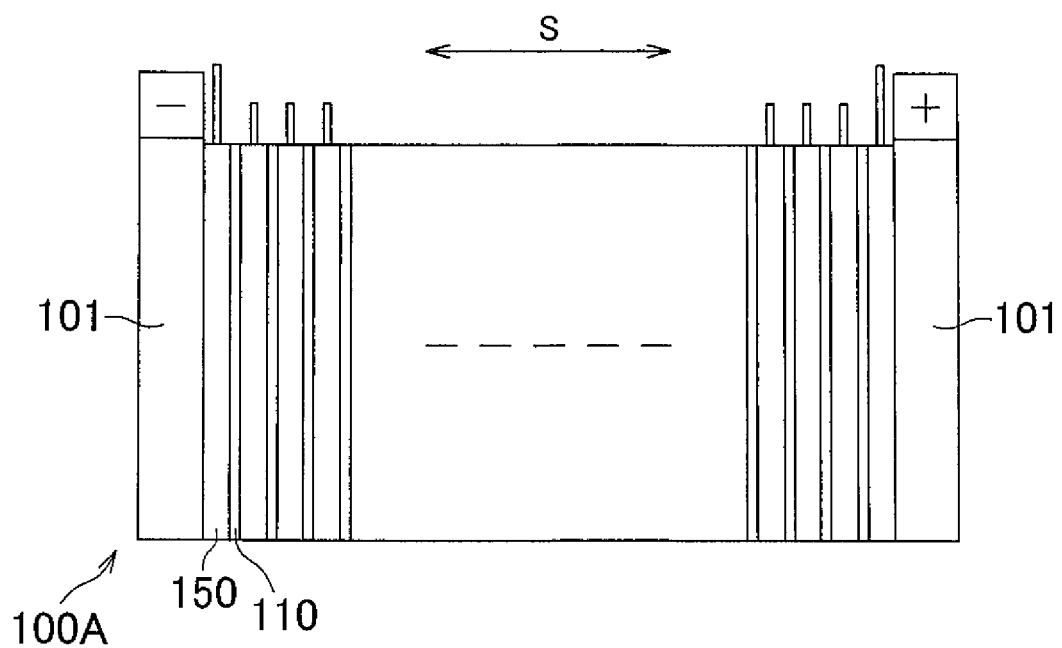
FIG. 10 is a cross-sectional view of the structure of a battery module according to the related art.
Figure 11:
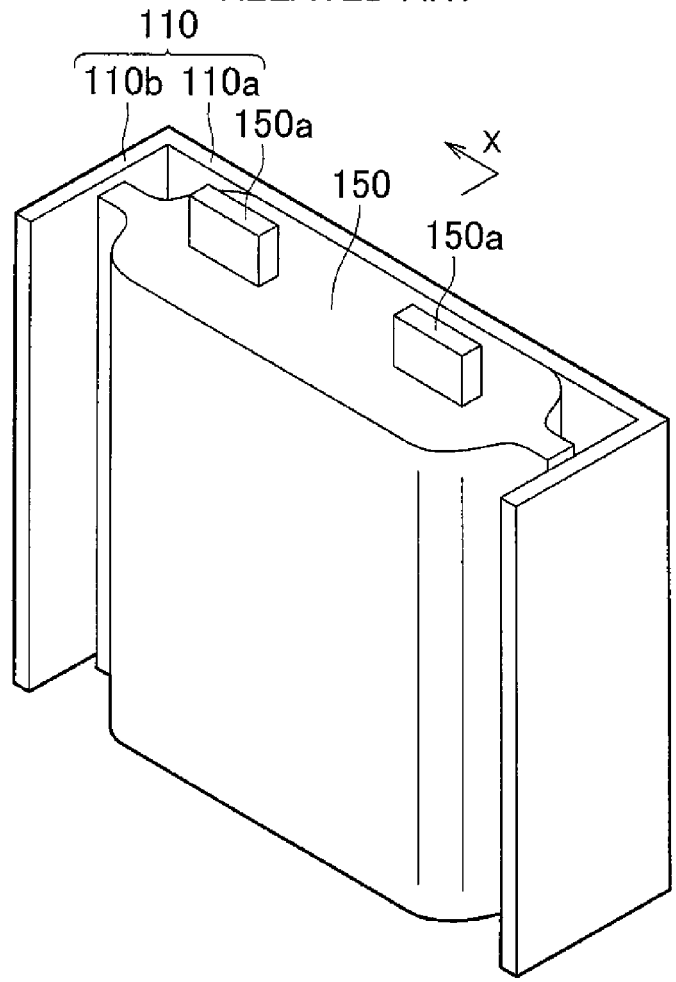
FIG. 11 is a perspective view of the structure of each battery cell pack and the structure of each heat dissipation plate according to the related art.

In addition, the basic configuration of a battery module 100 according to a first embodiment described below is the same as that of the battery module 100A shown in FIG. 10 to FIG. 12, and the structure of each heat dissipation plate in the embodiments described below has a characteristic feature. Thus, like reference numerals denote the same or corresponding components, and the overlap description may not be repeated.

Battery Module 100

Figure 1:
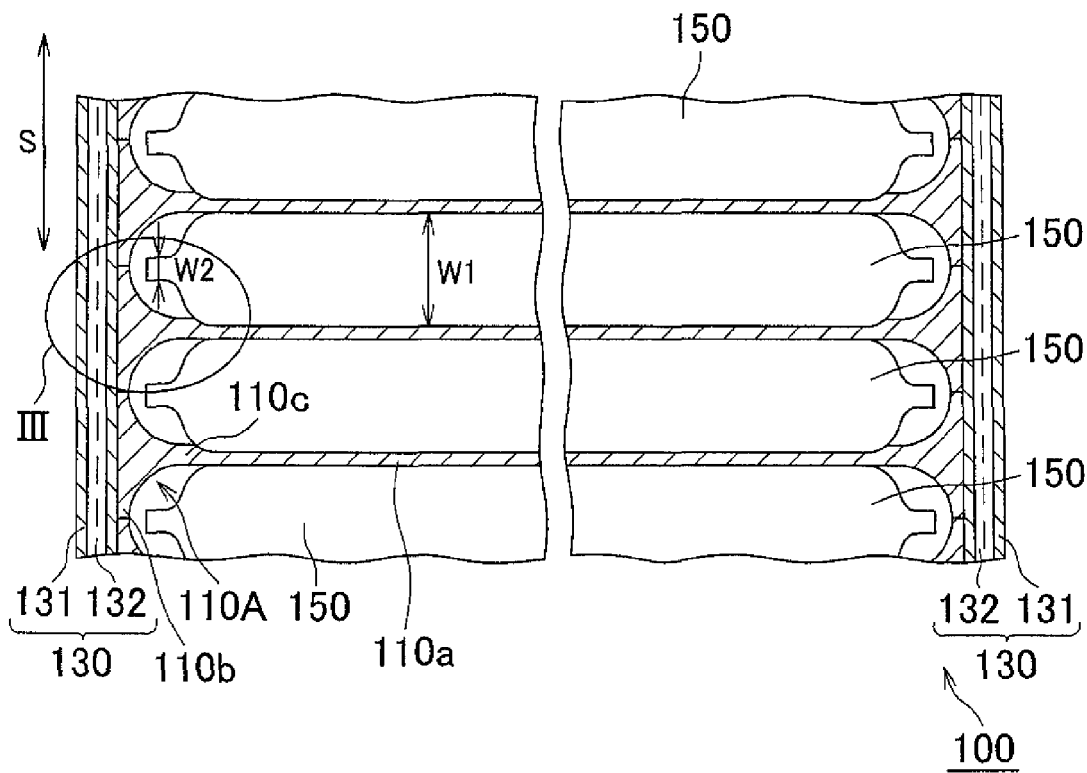
FIG. 1 is a partially enlarged view of the cross-sectional structure of a battery module according to a first embodiment.
Figure 2:
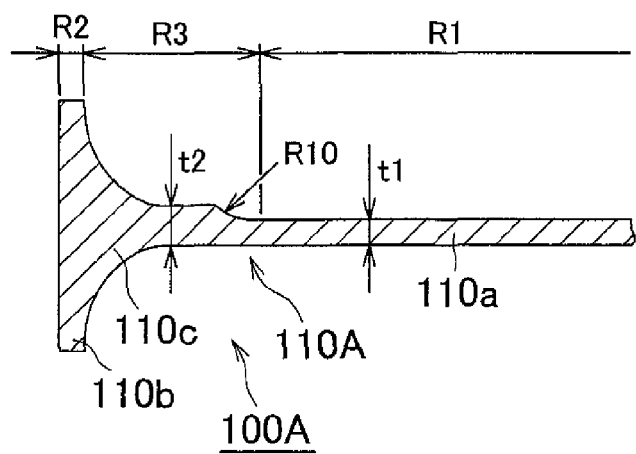
FIG. 2 is a partially enlarged cross-sectional view of the structure of each heat dissipation plate employed in the battery module according to the first embodiment.
Figure 3:
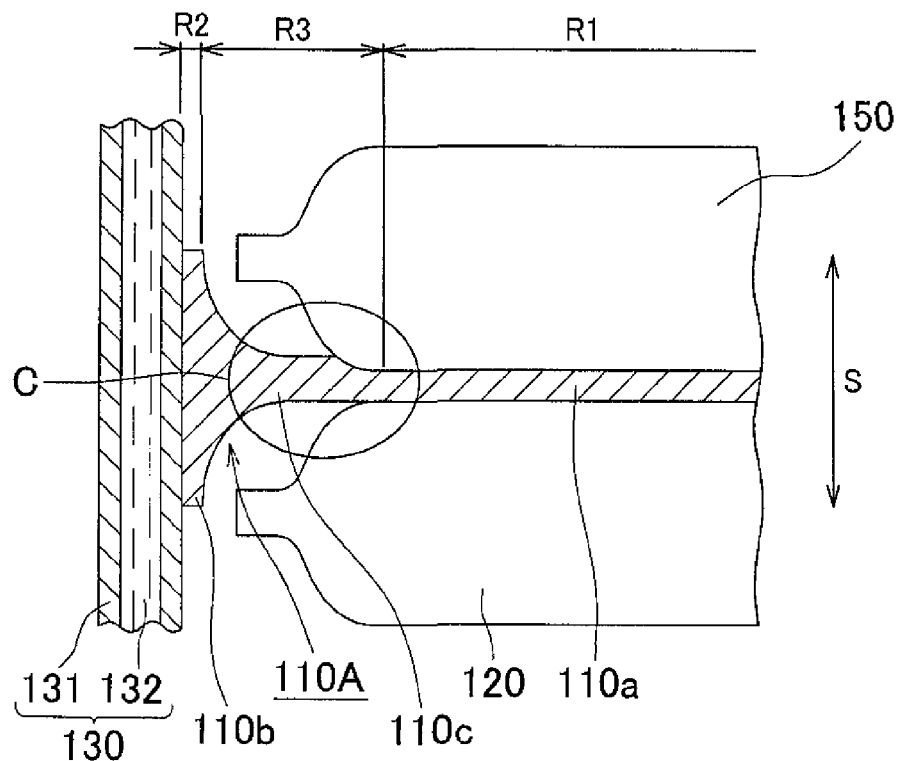
FIG. 3 is a partially enlarged cross-sectional view of region III circled in FIG. 1.

Hereinafter, the structure of the battery module 100 according to the first embodiment will be described with reference to FIG. 1 to FIG. 3. FIG. 1 is a partially enlarged view of the cross-sectional structure of the battery module 100. FIG. 2 is a partially enlarged view of the cross-sectional structure of each heat dissipation plate 110A employed in the battery module 100. FIG. 3 is a partially enlarged cross-sectional view of region III circled in FIG. 1.

Note that the cross-sectional views shown in FIG. 1 to FIG. 3 are taken along the cross section that extends along a stacking direction S in which battery cell packs 150 and the heat dissipation plates 110A are stacked and that includes coolers 130 respectively arranged along both sides of the battery module 100. This also applies to FIG. 4 to FIG. 8 described later.

As shown in FIG. 1 and FIG. 2, the battery module 100 includes the plurality of battery cell packs 150 and the plurality of heat dissipation plates 110A. The battery cell packs 150 and the heat dissipation plates 110A are alternately stacked in the stacking direction S.

The coolers 130 are respectively arranged on both sides of the battery module 100. The coolers 130 absorb heat radiated from the battery cell packs 150 and absorbed by the heat dissipation plates 110A. Each of the coolers 130 has a cooling pipe 131 and a cooling medium 132. The cooling pipe 131 is in contact with the outer faces of side wall plate portions 110b of the heat dissipation plates 110A. The cooling medium 132 is introduced into the cooling pipe 131.

Figure 12:
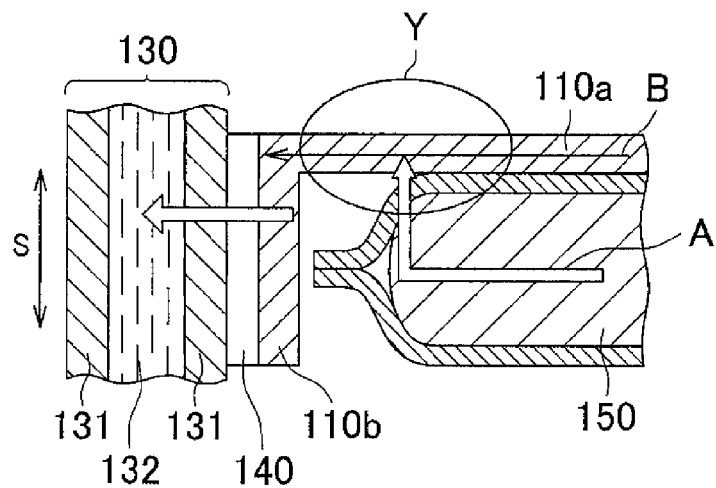
FIG. 12 is a cross-sectional view of a cooling structure employed in the battery module according to the related art.

Grease is applied between the cooling pipes 131 and the outer faces of the side wall plate portions 110b in order to increase heat transfer therebetween (see FIG. 12). However, grease is not shown in the drawings.

Each of the battery cell packs 150 generally has a structure as follows. Lithium cobaltate ($LiCoO_2$) or lithium manganate ($LiMnO_2$) is used as a positive electrode, and graphite (carbon) is used as a negative electrode. A separator is interposed between the electrodes for electrical insulation. Several layers of the electrode plates are stacked and then sealed with aluminum lamination, or the like, together with an electrolytic solution.

In the present embodiment, the thickness W2 of each end portion of each battery cell pack 150, located adjacent to any one of the coolers 130, in the stacking direction S is smaller than the thickness W1 of the center portion of each battery cell pack 150. Note that the outer shape of the battery cell pack 150 is not limited to this shape.

Detailed Structure of Heat Dissipation Plate 110A

FIG. 2 shows the detailed structure of each heat dissipation plate 110A. In the drawing, only one end side is shown; however, the structure of the other end side is the same. Each of the heat dissipation plates 110A has an interlayer plate portion 110a and side wall plate portions 110b. The interlayer plate portion 110a is in plane contact with corresponding two of the battery cell packs 150. The side wall plate portions 110b extend in the stacking direction S with respect to the interlayer plate portion 110a on both ends of the interlayer plate portion 110a. The outer faces of the side wall plate portions 110b are in contact with the respective coolers 130.

Furthermore, a thick region 110c is provided between the interlayer plate portion 110a and each side wall plate portion 110b. The thickness t2 of each thick region 110c is larger in cross section than the thickness t1 of the interlayer plate portion 110a. Each thick region 110c has a recessed portion R10 having a shape along a curved surface portion of the corresponding battery cell pack 150.

In the present embodiment, each thick region 110c has such a shape that the thickness of the thick region 110c in cross section increases to form a concave outer face from the interlayer plate portion 110a toward the side wall plate portion 110b. In addition, the concave outer face of each thick region 110c is formed on both sides in the thickness direction of the interlayer plate portion 110a.

As shown in FIG. 2, in the present embodiment, in each heat dissipation plate 110A, the region indicated by R1 constitutes the interlayer plate portion 110a, the region indicated by R2 constitutes the side wall plate portion 110b, and the thick region 110c indicated by R3 constitutes a low thermal resistance region.

In the present embodiment, the interlayer plate portion 110a, side wall plate portions 110b and thick regions 110c of each heat dissipation plate 110A are formed of an integrated continuous member (single-piece member). Each heat dissipation plate 110A is made of a material having an excellent thermal conductivity (aluminum, or the like).

As shown in FIG. 3, when the battery cell packs 150 and the heat dissipation plates 110A are alternately arranged in the stacking direction S, each thick region 110c that serves as the low thermal resistance region is formed in circled region C in each heat dissipation plate 110A.

By so doing, heat emitted from the battery cell packs 150 conducts toward the side wall plate portions 110b with less thermal resistance. As a result, heat conducting to the side wall plate portions 110b conducts toward the coolers 130. In this way, it is possible to effectively cool the battery cell packs 150.

In this way, the thick regions 110c are partially provided in the heat dissipation plates 110A, so the size of the battery module 100 does not increase. In addition, each of the battery cell packs 150 has such a structure that both end portions are thinner than the center portion. By so doing, even when the battery cell packs 150 are stacked, spaces are formed between the battery cell packs 150 at both end portions. Therefore, the thick regions 110c may be arranged in these spaces to make it possible to avoid an increase in the size of the battery module 100 in the stacking direction S.

Figure 4:
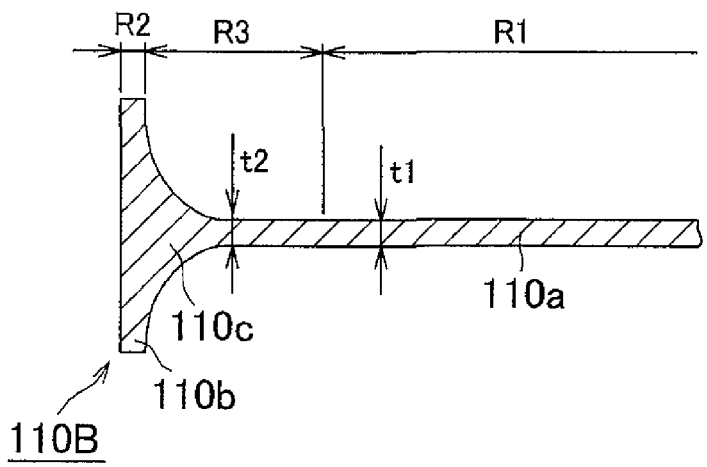
FIG. 4 is a partially enlarged cross-sectional view of the structure of each heat dissipation plate according to a second embodiment.

In addition, the battery cell packs 150 are effectively cooled, so it is possible to reduce a temperature difference within each of the battery cell packs 150 and a temperature difference among the stacked battery cell packs 150. Therefore, it is also possible to maintain and improve the performance of the battery module 100 as a whole. Note that, as shown in FIG. 4, a heat dissipation plate 110B that has no recessed portion R10 in each thick region 110c may also be employed (second embodiment).

Other structures of Heat Dissipation Plate

The heat dissipation plate 110A according to the first embodiment and the heat dissipation plate 100B according to the second embodiment are examples. Each heat dissipation plate may have the following structures shown in FIG. 5 to FIG. 8. Note that FIG. 5 to FIG. 8 are partially enlarged cross-sectional views of the structures of respective heat dissipation plates according to third to seventh embodiments.

Heat Dissipation Plate 110C

Figure 5:
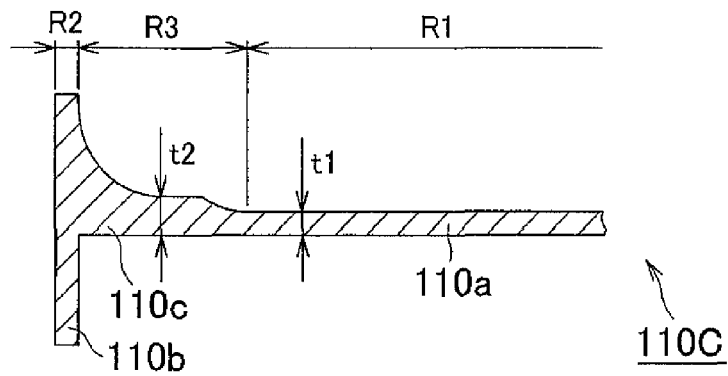
FIG. 5 is a partially enlarged cross-sectional view of the structure of each heat dissipation plate according to a third embodiment.

As shown in FIG. 5, in comparison with the heat dissipation plate 110A, the heat dissipation plate 110C has such a shape that the thickness of the heat dissipation plate 110C increases to form a concave outer face from the interlayer plate portion 110a toward the side wall plate portion 110b only at the upper side of the heat dissipation plate 110C.

In this shape as well, as in the case of the above described heat dissipation plate 110A, the region indicated by R1 constitutes the interlayer plate portion, the region indicated by R2 constitutes the side wall plate portion, and the thick region indicated by R3 constitutes the low thermal resistance region. As a result, similar operation and advantageous effects to those of the heat dissipation plate 110A may be obtained. Note that the configuration of a heat dissipation plate that has a thick region only at its lower side may also be employed.

Heat Dissipation Plate 110D

Figure 6:
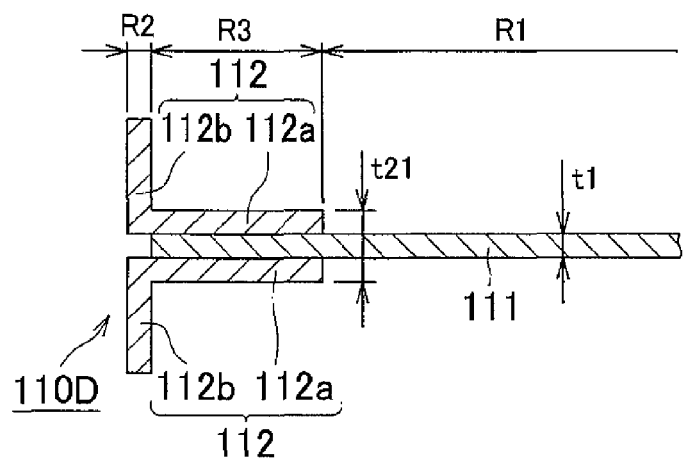
FIG. 6 is a partially enlarged cross-sectional view of the structure of each heat dissipation plate according to a fourth embodiment.

As shown in FIG. 6, a heat dissipation plate 110D has an interlayer plate portion 111 and L-shaped angle members 112. The interlayer plate portion 111 has a thickness t1. The L-shaped angle members 112 are welded to the interlayer plate portion 111 at each end portion of the interlayer plate portion 111 such that the L-shaped angle members 112 are symmetrical in the vertical direction (stacking direction) in the drawing.

Each of the angle members 112 has a first angle plate portion 112a and a second angle plate portion 112b. The first angle plate portion 112a is welded to the interlayer plate portion 111. The second angle plate portion 112b extends in the stacking direction S with respect to the first angle plate portion 112a, and is in contact with the cooler 130. The interlayer plate portion 111 and the angle members 112 are made of a material having an excellent thermal conductivity (aluminum, or the like).

In a region in which the first angle plate portions 112a of the angle members 112 are overlapped on both sides of the interlayer plate portion 111, the thickness of the region is t21 that is larger than the thickness t1 of the interlayer plate portion 111.

In this shape as well, as in the case of the above described heat dissipation plate 110A, the region indicated by R1 constitutes the interlayer plate portion, the region indicated by R2 constitutes the side wall plate portion, and the thick region indicated by R3 constitutes the low thermal resistance region. As a result, similar operation and advantageous effects to those of the heat dissipation plate 110A may be obtained.

Note that the configuration of a heat dissipation plate that has the angle member 112 only at its upper side (or lower side) may also be employed.

Heat Dissipation Plate 110E

Figure 7:
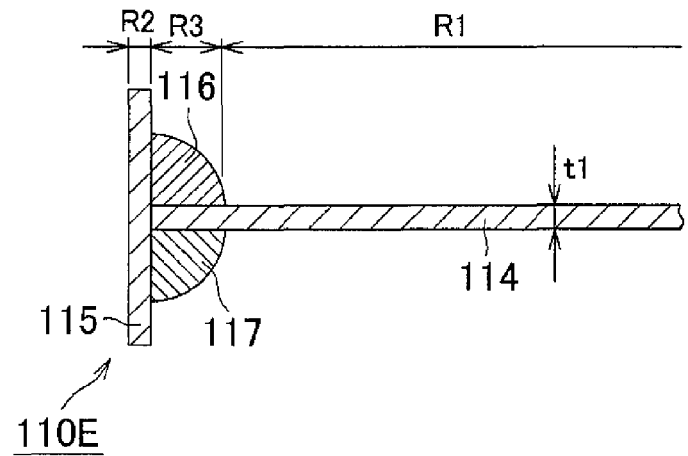
FIG. 7 is a partially enlarged cross-sectional view of the structure of each heat dissipation plate according to a fifth embodiment.

As shown in FIG. 7, a heat dissipation plate 110E has an interlayer plate portion 114 and plate portions 115. The interlayer plate portion 114 has a thickness t1. The plate portions 115 extend in the vertical direction (stacking direction) in the drawing on both end portions of the interlayer plate portion 114. The interlayer plate portion 114 and the plate portions 115 are made of a material having an excellent thermal conductivity (aluminum, or the like).

The interlayer plate portion 114 and the plate portions 115 are connected by welding. Fillet portions are formed by welding at corners that are formed by the interlayer plate portion 114 and the plate portions 115. The thickness of the interlayer plate portion 111 increases at the fillet portions.

In this shape as well, as in the case of the above described heat dissipation plate 110A, the region indicated by R1 constitutes the interlayer plate portion, the region indicated by R2 constitutes the side wall plate portion, and the thick region indicated by R3 constitutes the low thermal resistance region. As a result, similar operation and advantageous effects to those of the heat dissipation plate 110A may be obtained.

Note that the configuration of a heat dissipation plate that has the plate portion 115 extending upward or downward only and that increases the thickness of the interlayer plate portion 114 by welding may also be employed.

Heat Dissipation Plate 110F

Figure 8:
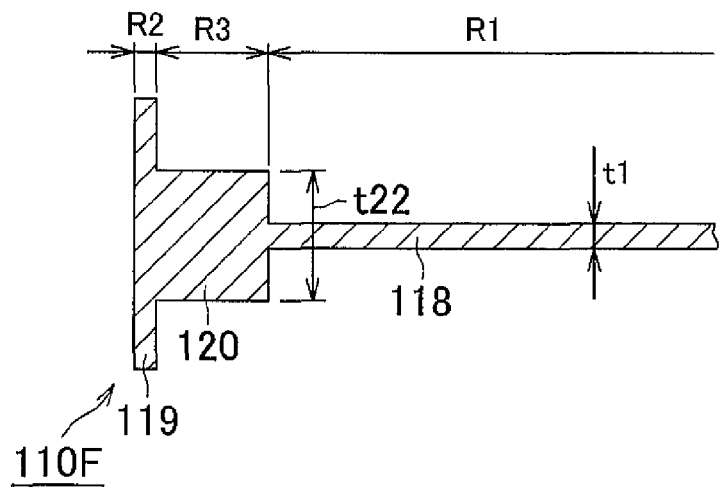
FIG. 8 is a partially enlarged cross-sectional view of the structure of each heat dissipation plate according to a sixth embodiment.

As shown in FIG. 8, a heat dissipation plate 110F has an interlayer plate portion 118, plate portions 119 and block-shaped thick regions 120. The interlayer plate portion 118 has a thickness t1. The plate portions 119 extend in the vertical direction (stacking direction) in the drawing on both end portions of the interlayer plate portion 118. The thick regions 120 each are provided between the interlayer plate portion 118 and each plate portion 119, and have a thickness t22 larger than the thickness t1 of the interlayer plate portion 118.

The interlayer plate portion 118, plate portions 119 and thick regions 120 of the heat dissipation plate 110F are formed of an integrated continuous member (single-piece member). The heat dissipation plate 110F is made of a material having an excellent thermal conductivity (aluminum, or the like).

In this shape as well, as in the case of the above described heat dissipation plate 110A, the region indicated by R1 constitutes the interlayer plate portion, the region indicated by R2 constitutes the side wall plate portion, and the thick region indicated by R3 constitutes the low thermal resistance region. As a result, similar operation and advantageous effects to those of the heat dissipation plate 110A may be obtained.

Note that the configuration of a heat dissipation plate that has the block-shaped thick region only at its upper side or lower side may also be employed.

Heat Dissipation Plate 110G

Figure 9:
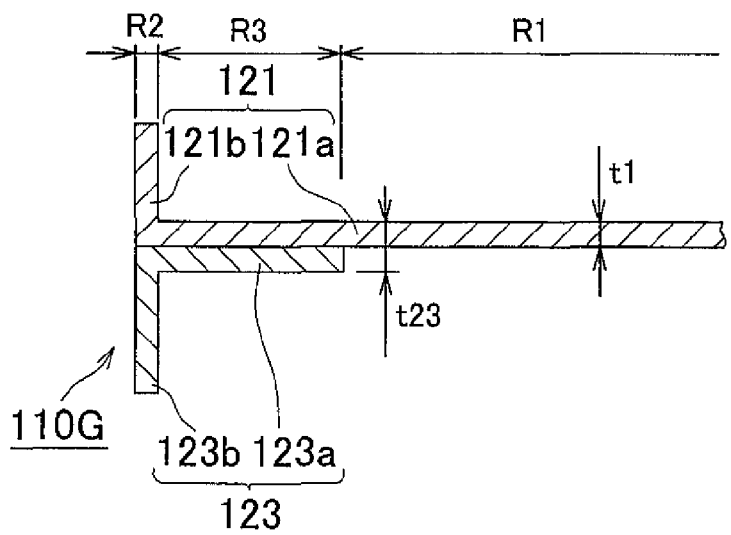
FIG. 9 is a partially enlarged cross-sectional view of the structure of each heat dissipation plate according to a seventh embodiment.

As shown in FIG. 9, a heat dissipation plate 110G has an interlayer plate portion 121 and L-shaped angle members 123. The interlayer plate portion 121 has a thickness t1. The L-shaped angle members 123 are connected by welding at both end portions of the interlayer plate portion 121.

The interlayer plate portion 121 has a first plate portion 121a and second plate portions 121b. The first plate portion 121a is in plane contact with the battery cell pack 150. The second plate portions 121b extend upward in the drawing in the stacking direction S. The outer faces of the second plate portions 121b are respectively in contact with the coolers 130.

In addition, each angle member 123 has a first angle plate portion 123a and a second angle plate portion 123b. The first angle plate portion 123a is welded to the first plate portion 121a. The second angle plate portion 123b extends downward in the drawing in the stacking direction S with respect to the first angle plate portion 123a, and is in contact with the corresponding cooler 130. The interlayer plate portion 121 and the angle members 123 are made of a material having an excellent thermal conductivity (aluminum, or the like).

In a region in which the first angle plate portion 123a of the angle member 123 is overlapped on one side of the interlayer plate portion 121, the thickness of the region is t23 that is larger than the thickness t1 of the first plate portion 121a.

In this shape as well, as in the case of the above described heat dissipation plate 110A, the region indicated by R1 constitutes the interlayer plate portion, the region indicated by R2 constitutes the side wall plate portion, and the thick region indicated by R3 constitutes the low thermal resistance region. As a result, similar operation and advantageous effects to those of the heat dissipation plate 110A may be obtained.

Note that, in the drawing, the arrangement of the second plate portion 121b and the angle member 123 may be inverted upside down.

The embodiments of the invention are described above; however, the embodiments described above should be regarded as only illustrative in every respect and not restrictive. The scope of the invention is defined by the appended claims. The scope of the invention is intended to encompass all modifications within the scope of the appended claims and equivalents thereof.

What is claimed is:

1. A battery module comprising:
   a plurality of battery cell packs, each having a substantially rectangular shape, wherein each of the battery cell packs includes end portions disposed along shorter sides thereof;
   a plurality of heat dissipation plates, the battery cell packs and the heat dissipation plates being alternately stacked in a stacking direction; and
   a cooler that absorbs heat radiated from the battery cell packs and absorbed by the heat dissipation plates, wherein
   each of the heat dissipation plates has an interlayer plate portion that is in contact with corresponding two of the battery cell packs and side wall plate portions that extend in the stacking direction with respect to the interlayer plate portion on both end sides of the interlayer plate portion and that are in contact with the cooler at outer faces thereof, and
   each of the heat dissipation plates has a low thermal resistance region between the interlayer plate portion and each side wall plate portion, the low thermal resistance region having a lower thermal resistance than the interlayer plate portion,
   wherein, in a cross-sectional view that is taken along the stacking direction and that includes the cooler, the cooler is arranged along side faces of the battery module at which the end portions are disposed, and wherein, in the cross-sectional view that is taken along the stacking direction and that includes the cooler, each of the end portions of the battery cell packs is disposed in a space defined by adjacent ones of the low thermal resistance regions, wherein the low thermal resistance region has a shape, when viewed in cross section, in which the thickness increases to form a curved concave outer face that increases in thickness in a direction from the interlayer plate portion toward the side wall plate portion.

2. The battery module according to claim 1, wherein, in a cross-sectional view that is taken along the stacking direction and that includes the cooler, each low thermal resistance region is provided on both sides of the corresponding interlayer plate portion in a thickness direction of the interlayer plate portion.

3. The battery module according to claim 1, wherein, in a cross-sectional view that is taken along the stacking direction and that includes the cooler, each low thermal resistance region is provided only on one side of the corresponding interlayer plate portion in a thickness direction of the interlayer plate portion.

4. The battery module according to claim 1, wherein, in a cross-sectional view that is taken along the stacking direction and that includes the cooler, a thickness of each low thermal resistance region is larger than a thickness of the corresponding interlayer plate portion.

5. The battery module according to claim 1, wherein the low thermal resistance regions, the interlayer plate portion and the side wall plate portions are formed of a single-piece member.

6. The battery module according to claim 1, wherein each low thermal resistance region has a recessed portion having a shape along end portions of a corresponding one of the battery cell packs.

7. The battery module according to claim 1, wherein adjacent ones of the side wall plate portions contact each other in the stacking direction and each of the battery cell packs is arranged in a space between adjacent two heat dissipation plates in the stacking direction.

8. The battery module according to claim 1, wherein a portion of the battery cell packs are in direct contact with the low thermal resistance region.

9. The battery module according to claim 1, wherein a thickness of the end portions of each battery cell pack is smaller than a thickness of a center portion of each battery cell pack.

* * * * *